(12) United States Patent
Van Pottelberge et al.

(10) Patent No.: US 11,395,488 B2
(45) Date of Patent: Jul. 26, 2022

(54) USE OF COMPOSITIONS COMPRISING PELARGONIC ACID AND SPECIFIC NON IONIC SURFACTANTS FOR INHIBITING THE GROWTH OF SUCKERS ON PLANTS

(71) Applicant: BELCHIM CROP PROTECTION NV, Londerzeel (BE)

(72) Inventors: Steven Van Pottelberge, Londerzeel (BE); Johan Desnouck, Londerzeel (BE); Caroline Nguyen, Londerzeel (BE)

(73) Assignee: BELCHIM CROP PROTECTION NV, Londerzeel (BE)

( * ) Notice: Subject to any disclaimer, the term of this patent is extended or adjusted under 35 U.S.C. 154(b) by 256 days.

(21) Appl. No.: 16/324,162

(22) PCT Filed: Aug. 18, 2017

(86) PCT No.: PCT/EP2017/070914
§ 371 (c)(1),
(2) Date: Feb. 8, 2019

(87) PCT Pub. No.: WO2018/033617
PCT Pub. Date: Feb. 22, 2018

(65) Prior Publication Data
US 2019/0166831 A1    Jun. 6, 2019

(30) Foreign Application Priority Data

Aug. 18, 2016    (EP) .................... 16184747

(51) Int. Cl.
*A01N 37/02*    (2006.01)
*A01N 25/30*    (2006.01)

(52) U.S. Cl.
CPC ............. *A01N 37/02* (2013.01); *A01N 25/30* (2013.01)

(58) Field of Classification Search
CPC ................................ A01N 37/02; A01N 25/30
See application file for complete search history.

(56) References Cited

U.S. PATENT DOCUMENTS

| | | |
|---|---|---|
| 3,326,664 A | 6/1967 | Tso |
| 3,340,040 A | 9/1967 | Tso |
| 3,556,763 A | 1/1971 | Gower et al. |
| 3,888,654 A | 6/1975 | Abramitis |
| 3,900,307 A | 8/1975 | Abramitis |
| 3,985,541 A | 10/1976 | Glasl et al. |
| 4,047,925 A | 9/1977 | Barer |
| 5,541,153 A | 7/1996 | Coultas |
| 5,714,435 A | 2/1998 | Coultas |
| 6,451,739 B1 | 9/2002 | Kober et al. |

FOREIGN PATENT DOCUMENTS

| | | | |
|---|---|---|---|
| AU | 437 757 B2 | 7/1973 | |
| CA | 836 460 A | 3/1970 | |
| CA | 968 176 A | 5/1975 | |
| EP | 2120586 B1 * | 7/2018 | ............... C05G 5/27 |
| WO | WO-9400985 A1 * | 1/1994 | ............. A01N 37/02 |
| WO | WO-2006126211 A2 * | 11/2006 | ............. A01N 61/02 |
| WO | WO-2008034602 A2 * | 3/2008 | ............. A01N 33/18 |

OTHER PUBLICATIONS

TWEEN-20 (obtained online via www.sigmaaldricj.com) (Year: 2020).*
PCT International Search Report and Written Opinion dated Oct. 5, 2017 in connection with PCT International Patent Application No. PCT/EP2017/070914.
PCT Notification of the International Preliminary Report on Patentability dated Oct. 22, 2018 in connection with PCT International Patent Application No. PCT/EP2017/070914.

* cited by examiner

*Primary Examiner* — Alton N Pryor
(74) *Attorney, Agent, or Firm* — Amster, Rothstein & Ebenstein LLP

(57) ABSTRACT

The present invention relates to the use of pelargonic acid and one or more nonionic surfactants for inhibiting the growth of suckers on plants. It also relates to a composition comprising pelargonic acid and one or more nonionic surfactants in an amount effective for inhibiting the growth of suckers in plants. Preferably, the composition comprises pelargonic acid in an amount between 50 and 90 w/w % and one or more polyoxyethylene glycol sorbitan alkyl esters or sorbitan alkyl esters in an amount between 10 and 50 w/w %, in which 100 w/w % is the total amount of pelargonic acid and one or more polyoxyethylene glycol sorbitan alkyl esters or sorbitan alkyl ester. It also relates to a method of applying pelargonic acid or the composition in an amount effective to inhibit for inhibiting the growth of suckers on plants.

8 Claims, 4 Drawing Sheets

FINALSAN TVK 6.18%    FINALSAN TVK 6.18%

SCYTHE 2.39%    SCYTHE 2.39%

BCP 1004D at 2%    BCP 1004D at 2%

FIG. 4

USE OF COMPOSITIONS COMPRISING PELARGONIC ACID AND SPECIFIC NON IONIC SURFACTANTS FOR INHIBITING THE GROWTH OF SUCKERS ON PLANTS

CROSS-REFERENCE TO RELATED APPLICATIONS

This application is a U.S. national stage entry under 35 U.S.C. § 371 of PCT International Patent Application No. PCT/EP2017/070914, filed on Aug. 18, 2017, which claims priority to European Patent Application No. 16184747.0, filed on Aug. 18, 2016, the contents of which are incorporated herein by reference in their entirety.

FIELD OF THE INVENTION

The present invention relates to the use of pelargonic acid for inhibiting the growth of suckers on plants. It also relates to a composition comprising pelargonic acid and one or more nonionic surfactants in an amount effective for inhibiting the growth of suckers in plants. Preferably, the composition comprises pelargonic acid in an amount between 50 and 90 w/w % and one or more sorbitan- or polysorbate-type nonionic surfactants in an amount between 10 and 50 w/w %, in which 100 w/w % is the total amount of pelargonic acid and one or more sorbitan- or polysorbate-type nonionic surfactants. It also relates to a method of applying pelargonic acid or the composition in an amount effective to inhibit the growth of suckers on plants.

BACKGROUND

In many plant varieties, the central stem initiates the outgrowth of 'suckers', also known as 'sprouts'; 'shoots' or 'axillary buds', usually located at the axils of its leaves. Depending on the regulatory network (e.g., plant development, genotype, hormones and nutrients) of the central stem, these suckers can start growing and proliferate into a lateral branch. Biologically this is an important component of plant architecture as it allows for recovery after damage or loss of the main branch of the central plant. However, for many industrially grown plants these suckers represent an undesired property. If not eliminated or controlled, these suckers, effectively drain plant nutrients from the central plant and hinder its growth.

Removal of the suckers allows plants to focus resources into the main axis of growth, allowing the plant to achieve commercially optimal yields, such as its leaves, seeds or products made thereof. Currently suckers are controlled through either manual or chemical removal. Manual removal involves the physical separation of the sucker from the leaf axil, often performed by hand. This method is slow, cumbersome, laborious, and highly ineffective. It also has to be repeated regularly if control of a field is to be maintained.

Chemical sucker inhibition reduces hand labor, and results in a more efficient use of agricultural equipment. The products available today involve the application of chemicals directly to each undesirable sucker. The stronger chemicals are effective at burning away the sucker entirely; however, their application also requires great care since the chemicals will cause severe damage if brought into contact with the central plant or its leaves. When diluted, some chemicals can still inhibit the proliferation, but the dosage and frequency becomes difficult to evaluate, thus requiring a greater degree of monitoring. Other chemicals, such as maleic hydrazide, while also effective, are known to produce adverse ecological effects, thus compromising the quality and yield of leaves, or of the resultant products. Overall the available chemicals require thorough management and monitoring techniques to provide sufficient sucker growth control in order to obtain the desired growths and yields.

Accordingly, a need arises for an alternative chemical to effectively inhibit undesired sucker growth in plants; preferably without, or with the minimum of adverse effects on the plant, its leaves, the yield or the products made therefrom. Another object is to provide a composition with a low or no phytotoxicity, which will not introduce any foreign residues or metabolic changes into the plant. Additionally, there is a need for a method to improve the management of the plants treated with said composition.

SUMMARY OF THE INVENTION

The present invention and embodiments thereof serve to provide a solution to one or more of the above-mentioned disadvantages. To this end, the present invention relates to the use of pelargonic acid for inhibiting the growth of suckers on plants.

In a first aspect, the present invention relates to the use of pelargonic acid for inhibiting the growth of suckers on plants, wherein said pelargonic acid is applied to a plant in an amount ranging from at least 0.5 g/l to at most 50.0 g/l.

In a further aspect, the present invention relates to the use of a composition comprising pelargonic acid and one or more nonionic surfactants for inhibiting the growth of suckers on plants, wherein said composition comprises pelargonic acid in an amount ranging from at least 0.5 g/l to at most 50.0 g/l; preferably from 1.5 to 35.0 g/l; more preferably from 2.5 to 25.0 g/l, from 3.0 to 20 g/l, from 13.6 to 20.4 g/l or from 17 to 27 g/l; most preferably from 3.5 to 15.0 g/l, wherein said one or more nonionic surfactants are selected from the list comprising ethoxylated alcohols (e.g. Empilan KI 6) and polyethylene glycol alkyl ethers such as octaethylene glycol monododecyl ether (e.g. Slovasol 248) or pentaethylene glycol monododecyl ether (e.g. Marlipal 24/50); polypropylene glycol alkyl ethers (e.g. Witconol APM); glucoside alkyl ethers such as decyl glucoside, lauryl glucoside, octyl glucoside, C8-C16 fatty alcoholglucoside (e.g. EcoSense™300 surfactant) or C8-C14 fatty alcohol glucoside (cocoglucoside) (e.g. EcoSense™ 919 surfactant); polyethylene glycol octylphenyl ethers or octylphenol ethoxylates (9-10 EO) (e.g. Triton X-100); polyethylene glycol alkylphenyl ethers such as nonoxynol-9 or Nonylphenol ethoxylates (10 EO) (e.g. Makon 10); glycerol alkyl esters such as glyceryl laurate (e.g. Monomuls 90-L-12); polyoxyethylene glycol sorbitan alkyl esters or polysorbates (e.g. Tween 85); sorbitan alkyl esters (e.g. Span 60); cocamide monoethanolamide (MEA) (e.g. Ninol CMP); cocamide diethonalamide (DEA) (e.g. Ninol 11-CM); dodecyldimethylamine oxide such as Lauramine oxide (e.g. Ammonyx); block copolymers of polyethylene glycol and polypropylene glycol (e.g. Pluronic PE 10500); polyethoxylated tallow amine (POEA) (e.g. Ethomeen C12); ethopropoxylated alcohols (e.g. Agnique® KE 3551); ethoxylated tristyrylphenols (e.g. Soprophor® BSU); ethopropoxylated tristyrylphenols (e.g. Soprophor® 796/P); ethoxylated tributyl phenols (e.g. Sapogenat® T 080) and/or ethoxylated vegetable oils (e.g. ethoxylated castor oils such as Lucramul® CO 40).

In a further aspect, the present invention relates to the use of a composition comprising pelargonic acid and two or more nonionic surfactants for inhibiting the growth of suckers on plants, wherein said composition comprises pelargonic acid in an amount ranging from at least 0.5 g/l to at most 50.0 g/l; preferably from 1.5 to 35.0 g/l; more preferably from 2.5 to 25.0 g/l, from 3.0 to 20 g/l, from 13.6 to 20.4 g/l or from 17 to 27 g/l; most preferably from 3.5 to 15.0 g/l,
wherein said one or more nonionic surfactants are selected from the list comprising ethoxylated alcohols (e.g. Empilan KI 6) and polyethylene glycol alkyl ethers such as octaethylene glycol monododecyl ether (e.g. Slovasol 248) or pentaethylene glycol monododecyl ether (e.g. Marlipal 24/50); polypropylene glycol alkyl ethers (e.g. Witconol APM); glucoside alkyl ethers such as decyl glucoside, lauryl glucoside, octyl glucoside, C8-C16 fatty alcoholglucoside (e.g. EcoSense™300 surfactant) or C8-C14 fatty alcohol glucoside (cocoglucoside) (e.g. EcoSense™ 919 surfactant); polyethylene glycol octylphenyl ethers or octylphenol ethoxylates (9-10 EO) (e.g. Triton X-100); polyethylene glycol alkylphenyl ethers such as nonoxynol-9 or Nonylphenol ethoxylates (10 EO) (e.g. Makon 10); glycerol alkyl esters such as glyceryl laurate (e.g. Monomuls 90-L-12); polyoxyethylene glycol sorbitan alkyl esters or polysorbates (e.g. Tween 85); sorbitan alkyl esters (e.g. Span 60); cocamide monoethanolamide (MEA) (e.g.Ninol CMP); cocamide diethonalamide (DEA) (e.g. Ninol 11-CM); dodecyldimethylamine oxide such as Lauramine oxide (e.g. Ammonyx); block copolymers of polyethylene glycol and polypropylene glycol (e.g. Pluronic PE 10500); polyethoxylated tallow amine (POEA) (e.g. Ethomeen C12); ethopropoxylated alcohols (e.g. Agnique® KE 3551); ethoxylated tristyrylphenols (e.g. Soprophor® BSU); ethopropoxylated tristyrylphenols (e.g. Soprophor® 796/P); ethoxylated tributyl phenols (e.g. Sapogenat® T 080) and/or ethoxylated vegetable oils (e.g. ethoxylated castor oils such as Lucramul® CO 40).

More particular, the uses as described herein provide that said one or more nonionic surfactants are polyoxyethylene glycol sorbitan alkyl esters or sorbitan alkyl esters, preferably chosen from polyoxyethylene sorbitan monooleate, polyoxyethylene sorbitan monolaurate, polyoxyethylene sorbitan monopalmitate, polyoxyethylene sorbitan monostearate, sorbitan monolaurate, sorbitan monopalmitate, sorbitan monostearate, sorbitan monooleate, sorbitan sesquioleate, sorbitan trioleate and/or sorbitan isostearate.

More particular, the uses as described herein provide that said composition comprises at least two nonionic surfactants, wherein a first nonionic surfactant is a polyoxyethylene glycol sorbitan alkyl ester, preferably chosen from polyoxyethylene sorbitan monooleate, polyoxyethylene sorbitan monolaurate, polyoxyethylene sorbitan monopalmitate and/or polyoxyethylene sorbitan monostearate; and wherein a second nonionic surfactant is a sorbitan alkyl ester, preferably chosen from, sorbitan monolaurate, sorbitan monopalmitate, sorbitan monostearate, sorbitan monooleate, sorbitan sesquioleate, sorbitan trioleate and/or sorbitan isostearate.

More particular, the uses as described herein provide in the use for inhibiting the growth of suckers on a tobacco, *chrysanthemum*, carnation and/or azalea plant.

In a further aspect, the present invention relates to a composition comprising pelargonic acid in an amount between 50 and 90 w/w % and one or more polyoxyethylene glycol sorbitan alkyl esters or sorbitan alkyl esters in an amount between 10 and 50 w/w %, in which 100 w/w % is the total amount of pelargonic acid and one or more sorbitan- or polysorbate-type nonionic surfactants.

In a still further aspect, the present invention relates to a composition comprising pelargonic acid in an amount between 50 and 90 w/w %, one or more sorbitan- or polysorbate-type nonionic surfactants in an amount between 10 and 45 w/w %, and in in which 100 w/w % is the total amount of pelargonic acid and the one or more sorbitan- or polysorbate-type nonionic surfactants in the composition, and further comprising one or more auxiliaries or inerts. Preferably the amount of auxiliaries or inerts is between 0 and 95% of the total w/w % of all constituents of the composition.

More particular, the composition as described herein provides that said composition comprises at least two nonionic surfactants, wherein a first nonionic surfactant is a polyoxyethylene glycol sorbitan alkyl ester, preferably chosen from polyoxyethylene sorbitan monooleate, polyoxyethylene sorbitan monolaurate, polyoxyethylene sorbitan monopalmitate and/or polyoxyethylene sorbitan monostearate; and wherein a second nonionic surfactant is a sorbitan alkyl ester, preferably chosen from, sorbitan monolaurate, sorbitan monopalmitate, sorbitan monostearate, sorbitan monooleate, sorbitan sesquioleate, sorbitan trioleate and/or sorbitan isostearate.

More particular, the composition as described herein provides that said composition comprises at least two nonionic surfactants, wherein a first nonionic surfactant is polyoxyethylene sorbitan monooleate and wherein a second nonionic surfactant is sorbitan monooleate.

More particular, the composition as described herein provides that said composition consists of pelargonic acid and one or more polyoxyethylene glycol sorbitan alkyl esters or sorbitan alkyl esters as nonionic surfactants.

In a further aspect, the present invention relates to a method for inhibiting the growth of suckers on plants, which comprises treating a plant with pelargonic acid or a composition comprising pelargonic acid and one or more nonionic surfactants, wherein said pelargonic acid is in an amount effective to inhibit the growth of one or more suckers on said plant; wherein said plant is preferably selected from tobacco, *chrysanthemum*, carnation and/or azalea.

In a still further aspect, the present invention relates to a method for inhibiting the growth of suckers on plants, which comprises treating a plant with a composition comprising pelargonic acid and two or more nonionic surfactants, wherein said pelargonic acid is in an amount effective to inhibit the growth of one or more suckers on said plant; wherein said plant is preferably selected from tobacco, *chrysanthemum*, carnation and/or azalea.

More particular, the method as described herein provides that pelargonic acid or the composition comprising pelargonic acid is applied during the initial development stage of an undesired sucker and wherein the pelargonic acid or the composition comprising pelargonic acid is reapplied at a specified time interval of 3 days to 10 days, preferably 4 to 8 days, most preferably 5 to 7 days, as from the initial development stage of an undesired sucker and this until the full development stage of the plant.

More particular, the method as described herein provides that the method comprises applying pelargonic acid or the composition comprising pelargonic acid in an amount ranging from at least 0.5 g/l to at most 50.0 g/l, preferably from 1.5 to 35.0 g/l; more preferably from 2.5 to 25.0 g/l, from 3.0 to 20 g/l, from 13.6 to 20.4 g/l or from 3.5 to 17 g/l; most preferably from 3.5 to 15.0 g/l.

More particular, the method as described herein provides that said composition comprises pelargonic acid and one or more nonionic surfactants preferably chosen from polyoxyethylene glycol sorbitan alkyl esters or sorbitan alkyl esters.

More particular, the method as described herein provides that the method comprises spraying, sprinkling, showering, spritzing, spreading in droplets, spattering; dispersing, diffusing; and/or douching one or more plants with pelargonic acid or a composition comprising pelargonic acid.

In a further aspect, the present invention relates to a surfactant system comprising one or more nonionic surfactants chosen from polyoxyethylene glycol sorbitan alkyl esters or sorbitan alkyl esters for sucker control on plants.

BRIEF DESCRIPTION OF THE DRAWINGS

The following numbering refers to: (100) plant; (110) field of plants; (150) sucker proliferated sucker; (160) inhibited sucker; (200) pelargonic acid; (250) agricultural equipment.

FIG. 1: shows a a tobacco plant (100) of the Burley variety; wherein

DETAILED DESCRIPTION OF THE INVENTION

Before the present system and method of the invention are described, it is to be understood that this invention is not limited to particular systems and methods or combinations described, since such systems and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members. The symbol "≥" means equal to or more than, e.g. ≥3 means three (3) or more.

All references cited in the present specification are hereby incorporated by reference in their entirety. In particular, the teachings of all references herein specifically referred to are incorporated by reference.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. Parenthesized or emboldened reference numerals affixed to respective elements merely exemplify the elements by way of example, with which it is not intended to limit the respective elements. It is to be understood that other embodiments may be utilised and structural or logical changes may be made without departing from the scope of the present invention. The following detailed description, therefore, is not to be taken in a limiting sense, and the scope of the present invention is defined by the appended claims.

Sucker growth inhibition is necessary for achieving high yields of quality plants, such as tobacco, *chrysanthemum*, carnation, azalea, and so on. Suckers are sprouts or buds which form at the axis of the main stalk of each plant variety.

If not eliminated or controlled, these suckers proliferate and grow, thereby draining effective plant nutrients from the central plant and hindering its growth. The desiccation of suckers, for instance by manual or chemical removal of an undesired sucker growth, allows the central plant to utilize the available energy for growth to optimal size, e.g. higher upwards, wider leaves, and so on depending on the plant variety.

It is the purpose of the invention to provide an alternative to the present sucker growth control chemicals or methods. Preferably, the invention provides an improved or at least a similar degree of sucker growth inhibition. Additionally or alternatively, the sucker growth inhibition is achieved without, or with the minimum of adverse effects (e.g. damage, foreign residues, metabolic changes, etc.) on the plant, its leaves, the yield or the products made therefrom. As such, the invention or any aspect thereof may lead to an improvement in phytotoxicity, efficacy, safety, stability, management, cost and/or time efficiency in comparison with the state of art chemical sucker growth inhibiting agents or methods.

In a first aspect the present invention relates to the use of pelargonic acid for inhibiting the growth of suckers on plants, wherein said pelargonic acid is applied to a plant in an amount ranging from at least 0.5 g/l to at most 50.0 g/l.

Preferably, in the use as described herein, pelargonic acid in an amount ranging between 1.5 and 35.0 g/l; more preferably between 2.5 and 25.0 g/l, between 3.0 and 20.0 g/l, between 13.6 and 20.4 g/l or between 17 and 27 g/l; most preferably between 10 and 20 g/l or between 3.5 and 15.0 g/l is used.

It has been unexpectedly found that when pelargonic acid is applied to a sucker in a low concentration (i.e. equal or below 50.0 g/l) it effectively inhibits the growth and proliferation of said sucker. Pelargonic acid as used herein can also be referred to as "nonanoic acid" or "1-Octanecarboxylic acid", and refers to an organic compound composed of a nine-carbon chain terminating in a carboxylic acid. The efficiency may be found discussed in further detail in Example 1.

Pelargonic acid has several advantages linked to its use as a sucker growth inhibitor in plants. Firstly, pelargonic acid appears to be very efficient. It has been found that the above concentrations effectively inhibit, disrupt and/or destroy sucker cells by inducing a natural stress upon take-up of pelargonic acid, which then disrupts the permeability of the plant's cell membranes leading to a breakdown of the undesired plant cells of said sucker. As such, control on a field of plants can easily be achieved by applying pelargonic acid in the above concentrations on the plant with a minimal of repetition. By minimizing the required steps and dosages the cost and/or time efficiency of the sucker growth inhibition treatment can be further improved. Also, pelargonic acid is not known to cause adverse ecological or phytotoxic effects when applied in the above concentrations; such as introducing foreign residues or inducing metabolic changes into the central plant. Therefore it may be used safely without significantly compromising the quality and yield of the plant, its leaves, or of the resultant products. Additionally, the above mentioned concentrations appear to be nontoxic and nonhazardous; for instance when sprayed of the central plant or its leaves. In fact, pelargonic acid is exempt from residue data and disappears from the ground in less than 2 days. Therefore its controlled use can improve both the user and plant safety when applied. Furthermore, due to its safety pelargonic acid can improve the method of application on plants. For example, when sprayed in a solution on plants or plant leaves, the pelargonic acid will flow along the plant's stem or shaft to reach the sucker, where it can effectively start inhibiting the sucker growth. This improves the user friendliness allowing a more efficient use of available product and equipment, which results in a more efficient management of time and costs. Also, pelargonic acid is a stable compound which can be easily concentrated, diluted and stored. This enables the production of a more concentrated pelargonic acid concentration, which can then be easily be diluted, for instance with water, to obtain the above concentration necessary for sucker growth inhibition. The availability of a concentrated variant allows for additional benefits in production ease, transport and storage costs; further improving the cost and/or time efficiency of the sucker growth inhibition treatment. Finally, pelargonic acid can easily be combined with additional (chemical) components to help steer the efficiency of sucker growth inhibition, depending on the plant variety, administration method, equipment, location, season, etc.

In some embodiments of the invention derivatives of pelargonic acid can also be used to achieve the same purpose. Examples of pelargonic acid derivatives are synthetic esters, such as methyl pelargonate, ethyl pelargonate, and so on.

According to the specific embodiments, the invention relates to the use of pelargonic acid and not to the esters or the salt thereof.

In a second aspect the present invention relates to the use of a composition comprising pelargonic acid and one or more nonionic surfactants as a sucker growth inhibitor for plants, wherein said composition comprises pelargonic acid in an amount ranging from at least 0.5 g/l to at most 50.0 g/l; preferably from 1.5 to 35.0 g/l; more preferably from 2.5 to 25.0 g/l, 3.0 to 20 g/l, from 13.6 to 20.4 g/l or from 17 g/l to 27 g/l; most preferably from 3.5 to 15.0 g/l. Surfactants, also known as surface active agents, are compounds that lower the surface tension (or interfacial tension) between two liquids or between a liquid and a solid.

Surfactants may act as detergents, wetting agents, emulsifiers, foaming agents, and dispersants. Many organic compounds exhibit some surfactant properties; however specifically for the purposes of the invention nonionic surfactants are used. Prominent among these are the fatty alcohols, such as cetyl alcohol, stearyl alcohol, and cetostearyl alcohol (consisting predominantly of cetyl and stearyl alcohols), and oleyl alcohol; but also polyethylene glycol alkyl ethers, such as octaethylene glycol monododecyl ether and pentaethylene glycol monododecyl ether; polypropylene glycol alkyl ethers; glucoside alkyl ethers, such as decyl glucoside, lauryl glucoside octyl glucoside; polyethylene glycol octylphenyl ethers, such as Triton X-100; polyethylene glycol alkylphenyl ethers, such as nonoxynol-9; glycerol alkyl esters, such as glyceryl laurate; polyoxyethylene glycol sorbitan alkyl esters, such as polysorbate; sorbitan alkyl esters, such as spans; cocamide MEA or DEA; dodecyldimethylamine oxide; block copolymers of polyethylene glycol and polypropylene glycol, such as poloxamers; polyethoxylated tallow amine (POEA); and the like, and even more specific nonionic surfactants for use according to the invention are: ethoxylated alcohols (e.g. Empilan KI 6) and polyethylene glycol alkyl ethers such as octaethylene glycol monododecyl ether (e.g. Slovasol 248) or pentaethylene glycol monododecyl ether (e.g. Marlipal 24/50); polypropylene glycol alkyl ethers (e.g. Witconol APM); glucoside alkyl ethers such as decyl glucoside, lauryl glucoside, octyl glucoside, C8-C16 fatty alcoholglucoside (e.g. EcoSense™300 surfactant) or C8-C14 fatty alcohol glucoside (cocoglucoside) (e.g.

EcoSense™ 919 surfactant); polyethylene glycol octylphenyl ethers or octylphenol ethoxylates (9-10 EO) (e.g. Triton X-100); polyethylene glycol alkylphenyl ethers such as nonoxynol-9 or Nonylphenol ethoxylates (10 EO) (e.g. Makon 10); glycerol alkyl esters such as glyceryl laurate (e.g. Monomuls 90-L-12); polyoxyethylene glycol sorbitan alkyl esters or polysorbates (e.g. Tween 85); sorbitan alkyl esters (e.g. Span 60); cocamide monoethanolamide (MEA) (e.g.Ninol CMP); cocamide diethonalamide (DEA) (e.g. Ninol 11-CM); dodecyldimethylamine oxide such as Lauramine oxide (e.g. Ammonyx); block copolymers of polyethylene glycol and polypropylene glycol (e.g. Pluronic PE 10500); polyethoxylated tallow amine (POEA) (e.g. Ethomeen C12); ethopropoxylated alcohols (e.g. Agnique® KE 3551); ethoxylated tristyrylphenols (e.g. Soprophor® BSU); ethopropoxylated tristyrylphenols (e.g. Soprophor® 796/P); ethoxylated tributyl phenols (e.g. Sapogenat® T 080) and/or ethoxylated vegetable oils (e.g. ethoxylated castor oils such as Lucramul® CO 40).

It has been unexpectedly observed that a composition comprising pelargonic acid and one or more listed nonionic surfactants are particularly effective and suitable for use as sucker growth inhibitor for plants. The listed nonionic surfactants can further improve the safety, efficacy and efficiency of the composition. This composition is particularly useful when applied as a dilution on plants, for it improves the dissolution with an aqueous solvent, such as water, without reducing the efficiency of the active ingredient to inhibit sucker growth in said plants.

In some embodiments the used composition comprises pelargonic acid and one or more nonionic surfactants as a sucker growth inhibitor for plants, wherein said composition comprises one or more nonionic surfactants in an amount ranging from at least 0.01 g/l to at most 50.0 g/l; preferably from 0.1 to 35.0 g/l; more preferably from 0.5 to 25.0 g/l; most preferably from 1.0 to 15.0 g/l.

In some embodiments the used composition comprises pelargonic acid and one or more nonionic surfactants as a sucker growth inhibitor for plants, wherein said composition comprises (a) pelargonic acid in an amount ranging from at least 0.5 g/l to at most 50.0 g/l; preferably from 1.5 to 35.0 g/l; more preferably from 2.5 to 25.0 g/l, 3.0 to 20 g/l or from 13.6 to 20.4 g/l; most preferably from 3.5 to 15.0 g/l; and (b) one or more nonionic surfactants in an amount ranging from at least 0.01 g/l to at most 50.0 g/l; preferably from 0.1 to 35.0 g/l; more preferably from 0.5 to 25.0 g/l; most preferably from 1.0 to 15.0 g/l.

In some preferred embodiments the used composition comprises pelargonic acid and one or more nonionic surfactants as a sucker growth inhibitor for plants, wherein said composition comprises pelargonic acid in an amount ranging from at least 0.5 g/l to at most 50.0 g/l; and one or more nonionic surfactants in an amount ranging from at least 0.01 g/l to at most 50.0 g/l.

In some other preferred embodiments the used composition comprises pelargonic acid and one or more nonionic surfactants as a sucker growth inhibitor for plants, wherein said composition comprises pelargonic acid in an amount ranging from at least 1.5 g/l to at most 35.0 g/l; and one or more nonionic surfactants in an amount ranging from at least 0.1 g/l to at most 35.0 g/l.

In some other preferred embodiments the used composition comprises pelargonic acid and one or more nonionic surfactants as a sucker growth inhibitor for plants, wherein said composition comprises pelargonic acid in an amount ranging from at least 2.5 g/l to at most 25.0 g/l; and one or more nonionic surfactants in an amount ranging from at least 0.5 g/l to at most 25.0 g/l.

In some other preferred embodiments the used composition comprises pelargonic acid and one or more nonionic surfactants as a sucker growth inhibitor for plants, wherein said composition comprises pelargonic acid in an amount ranging from at least 3.0 g/l to at most 20.0 g/l; and one or more nonionic surfactants in an amount ranging from at least 1 g/l to at most 6.5 g/l.

In some other preferred embodiments the used composition comprises pelargonic acid and one or more nonionic surfactants as a sucker growth inhibitor for plants, wherein said composition comprises pelargonic acid in an amount ranging from at least 13.6 g/l to at most 20.4 g/l; and one or more nonionic surfactants in an amount ranging from at least 4.4 g/l to at most 6.6 g/l.

In some other preferred embodiments the used composition comprises pelargonic acid and one or more nonionic surfactants as a sucker growth inhibitor for plants, wherein said composition comprises pelargonic acid in an amount ranging from at least 3.5 g/l to at most 17.0 g/l; and one or more nonionic surfactants in an amount ranging from at least 1.1 g/l to at most 5.5 g/l.

In some other preferred embodiments the used composition comprises pelargonic acid and one or more nonionic surfactants as a sucker growth inhibitor for plants, wherein said composition comprises pelargonic acid in an amount ranging from at least 3.5 g/l to at most 15.0 g/l; and one or more nonionic surfactants in an amount ranging from at least 1.0 g/l to at most 15.0 g/l.

It has also been unexpectedly observed that the above embodiments, in particular the preferred embodiments, further improve the efficiency of the use of the composition. In particular, a composition comprising pelargonic acid together with a polysorbate-type nonionic surfactant and a sorbitan-type nonionic surfactant in the above concentrations (g/l) has shown to achieve optimal results in terms of safety and efficacy. In one embodiment, the nonionic surfactants exemplified herein are sorbitan-type molecules, such as sorbitan alkyl esters, also named sorbitan esters. The terms sorbitan alkyl esters and sorbitan esters are used interchangeable herein and are referred to as sorbitan-type. In other embodiments or in combination with the previous embodiment, the nonionic surfactants exemplified herein are polysorbate-type, such as polyoxyethylene glycol sorbitan alkyl esters, also named polyoxyethylene sorbitan esters. The terms polyoxyethylene glycol sorbitan alkyl esters and polyoxyethylene sorbitan esters are used interchangeable herein and are referred to as polysorbate-type. The one or more sorbitan esters and/or polyoxyethylene sorbitan esters comprised in said composition are in the above concentrations (g/l). Even more in particular said composition in the above concentrations (g/l) can serve to further improve the cost and/or time efficiency of the sucker growth inhibition treatment by making a particular efficient use of the available product and equipment.

In some embodiments the use comprises one or more nonionic surfactants selected from the following list: ethoxylated alcohols (e.g. Empilan KI 6) and polyethylene glycol alkyl ethers such as octaethylene glycol monododecyl ether (e.g. Slovasol 248) or pentaethylene glycol monododecyl ether (e.g. Marlipal 24/50); polypropylene glycol alkyl ethers (e.g. Witconol APM); glucoside alkyl ethers such as decyl glucoside, lauryl glucoside, octyl glucoside, C8-C16 fatty alcoholglucoside (e.g. EcoSense™300 surfactant) or C8-C14 fatty alcohol glucoside (cocoglucoside) (e.g.

EcoSense™ 919 surfactant); polyethylene glycol octylphenyl ethers or octylphenol ethoxylates (9-10 EO) (e.g. Triton X-100); polyethylene glycol alkylphenyl ethers such as nonoxynol-9 or Nonylphenol ethoxylates (10 EO) (e.g. Makon 10); glycerol alkyl esters such as glyceryl laurate (e.g. Monomuls 90-L-12); polyoxyethylene glycol sorbitan alkyl esters or polysorbates (e.g. Tween 85); sorbitan alkyl esters (e.g. Span 60); cocamide monoethanolamide (MEA) (e.g.Ninol CMP); cocamide diethonalamide (DEA) (e.g. Ninol 11-CM); dodecyldimethylamine oxide such as Lauramine oxide (e.g. Ammonyx); block copolymers of polyethylene glycol and polypropylene glycol (e.g. Pluronic PE 10500); polyethoxylated tallow amine (POEA) (e.g. Ethomeen C12); ethopropoxylated alcohols (e.g. Agnique® KE 3551); ethoxylated tristyrylphenols (e.g. Soprophor® BSU); ethopropoxylated tristyrylphenols (e.g. Soprophor® 796/P); ethoxylated tributyl phenols (e.g. Sapogenat® T 080) and/or ethoxylated vegetable oils (e.g. ethoxylated castor oils such as Lucramul® CO 40). In other embodiments the one or more nonionic surfactants are selected from the following list: polyethylene glycol alkyl ethers such as octaethylene glycol monododecyl ether or pentaethylene glycol monododecyl ether; polypropylene glycol alkyl ethers; glucoside alkyl ethers such as decyl glucoside, lauryl glucoside or octyl glucoside; polyethylene glycol octylphenyl ethers such as Triton X-100; polyethylene glycol alkylphenyl ethers such as nonoxynol-9; glycerol alkyl esters such as glyceryl laurate; polyoxyethylene glycol sorbitan alkyl esters; sorbitan alkyl esters; cocamide MEA; cocamide DEA; dodecyldimethylamine oxide; block copolymers of polyethylene glycol and polypropylene glycol; and/or polyethoxylated tallow amine (POEA).

In some preferred embodiments the used composition comprises pelargonic acid and one or more nonionic surfactants that are polysorbate- or sorbitan-type nonionic surfactants; preferably chosen from as polyoxyethylene glycol sorbitan alkyl esters (polysorbate-type) and sorbitan alkyl esters (sorbitan-type); more preferably chosen from polyoxyethylene sorbitan monooleate, polyoxyethylene sorbitan monolaurate, polyoxyethylene sorbitan monopalmitate, polyoxyethylene sorbitan monostearate, sorbitan monolaurate, sorbitan monopalmitate, sorbitan monostearate, sorbitan monooleate, sorbitan sesquioleate, sorbitan trioleate and/or sorbitan isostearate; even more preferably the chosen from polyoxyethylene sorbitan monooleate, polyoxyethylene sorbitan monopalmitate, polyoxyethylene sorbitan monostearate, sorbitan monolaurate, sorbitan monopalmitate, sorbitan monostearate, sorbitan monooleate, sorbitan sesquioleate, sorbitan trioleate and/or sorbitan isostearate The inventors have unexpectedly found that the listed nonionic surfactants together with pelargonic acid create a particularly stable and efficient composition, most suitable for inhibiting the growth of suckers on plants. Moreover, the listed nonionic surfactants are not known to cause adverse ecological, toxic, phytotoxic, and/or hazardous effects when applied on plants. Therefore this composition may be used safely without significantly compromising the quality and yield of the plants, their leaves, or of the resultant products; and also the safety and health of the user or agricultural equipment.

It has been unexpectedly found that sorbitan- or polysorbate-type nonionic surfactants together with pelargonic acid create an even more stable and efficient composition. Moreover, said nonionic surfactants are especially safe, secure and cost-efficient; making their combination preferred for inhibiting the growth of suckers on plants.

Therefore, in some other preferred embodiments the used composition comprises pelargonic acid and at least two nonionic surfactants, wherein a first nonionic surfactant is a polyoxyethylene glycol sorbitan alkyl ester, preferably chosen from polyoxyethylene sorbitan monooleate, polyoxyethylene sorbitan monolaurate, polyoxyethylene sorbitan monopalmitate and/or polyoxyethylene sorbitan monostearate; and wherein a second nonionic surfactant is a sorbitan alkyl ester, preferably chosen from, sorbitan monolaurate, sorbitan monopalmitate, sorbitan monostearate, sorbitan monooleate, sorbitan sesquioleate, sorbitan trioleate and/or sorbitan isostearate.

In the embodiments where polyoxyethylene sorbitan esters are comprised in the composition, the number of ethylene oxide units may range between 1 and 20, preferably between 4 and 10, or between 10 and 20, more preferably between 5 and 16, between 8 and 20, or between 17 and 20, or most preferably between 12 and 20. The number of ethylene oxide units in the polyoxyethylene sorbitan ester surfactant in any of the compositions of the invention can be 1, 2, 3, 4, 5, 6, 7, 7, 8, 9, 10, 11, 12, 13, 14, 15, 16, 17, 18, 19 or 20.

In some more preferred embodiments the used composition comprises pelargonic acid and at least two nonionic surfactants, wherein a first nonionic surfactant is sorbitan monolaurate and a second nonionic surfactant is ethoxylated sorbitan monooleate.

In other preferred embodiments, the used composition comprises pelargonic acid and at least three nonionic surfactants chosen from the list of nonionic polyoxyethylene sorbitan esters and sorbitan esters provided above.

In some embodiments the used composition comprises pelargonic acid in an amount ranging from at least 0.5 g/l to at most 50.0 g/l; and at least two nonionic surfactants, wherein a first nonionic surfactant is sorbitan monolaurate in an amount ranging from at least 0.01 g/l to at most 50.0 g/l, and a second nonionic surfactant is ethoxylated sorbitan monooleate in an amount ranging from at least 0.01 g/l to at most 50.0 g/l.

In some more preferred embodiments the used composition comprises pelargonic acid and at least two nonionic surfactants, wherein a first nonionic surfactant is sorbitan monolaurate and a second nonionic surfactant is ethoxylated sorbitan trioleate.

In some embodiments the used composition comprises pelargonic acid in an amount ranging from at least 0.5 g/l to at most 50.0 g/l; and at least two nonionic surfactants, wherein a first nonionic surfactant is sorbitan monolaurate in an amount ranging from at least 0.01 g/l to at most 50.0 g/l, and a second nonionic surfactant is ethoxylated sorbitan trioleate in an amount ranging from at least 0.01 g/l to at most 50.0 g/l.

In some more preferred embodiments the used composition comprises pelargonic acid and at least two nonionic surfactants, wherein a first nonionic surfactant is sorbitan monostearate and a second nonionic surfactant is ethoxylated sorbitan monolaurate.

In some embodiments the used composition comprises pelargonic acid in an amount ranging from at least 0.5 g/l to at most 50.0 g/l; and at least two nonionic surfactants, wherein a first nonionic surfactant is sorbitan monostearate in an amount ranging from at least 0.01 g/l to at most 50.0 g/l, and a second nonionic surfactant is ethoxylated sorbitan monolaurate in an amount ranging from at least 0.01 g/l to at most 50.0 g/l.

In some more preferred embodiments the used composition comprises pelargonic acid and at least two nonionic surfactants, wherein a first nonionic surfactant is sorbitan sesquioleate and a second nonionic surfactant is ethoxylated sorbitan monolaurate.

In some more preferred embodiments the used composition comprises pelargonic acid and at least two nonionic surfactants, wherein a first nonionic surfactant is sorbitan monooleate and a second nonionic surfactant is ethoxylated sorbitan monooleate.

In some embodiments the used composition comprises pelargonic acid in an amount ranging from at least 0.5 g/l to at most 50.0 g/l; and at least two nonionic surfactants, wherein a first nonionic surfactant is sorbitan monooleate in an amount ranging from at least 0.01 g/l to at most 50.0 g/l, and a second nonionic surfactant is ethoxylated sorbitan monooleate in an amount ranging from at least 0.01 g/l to at most 50.0 g/l.

In some preferred embodiments the used composition comprises pelargonic acid in an amount ranging from at least 1.5 g/l to at most 35.0 g/l; and at least two nonionic surfactants, wherein a first nonionic surfactant is sorbitan monooleate in an amount ranging from at least 0.1 g/l to at most 35.0 g/l, and a second nonionic surfactant is ethoxylated sorbitan monooleate in an amount ranging from at least 0.1 g/l to at most 35.0 g/l.

In some preferred embodiments the used composition comprises pelargonic acid in an amount ranging from at least 2.5 g/l to at most 25.0 g/l; and at least two nonionic surfactants, wherein a first nonionic surfactant is sorbitan monooleate in an amount ranging from at least 0.5 g/l to at most 25.0 g/l, and a second nonionic surfactant is ethoxylated sorbitan monooleate in an amount ranging from at least 0.5 g/l to at most 25.0 g/l.

In some preferred embodiments the used composition comprises pelargonic acid in an amount ranging from at least 3.5 g/l to at most 15.0 g/l; and at least two nonionic surfactants, wherein a first nonionic surfactant is sorbitan monooleate in an amount ranging from at least 0.1 g/l to at most 15.0 g/l, and a second nonionic surfactant is ethoxylated sorbitan monooleate in an amount ranging from at least 1.0 g/l to at most 15.0 g/l.

In some preferred embodiments the used composition comprises pelargonic acid in an amount ranging from at least 13.6 g/l to at most 20.4 g/l; and at least two nonionic surfactants, wherein a first nonionic surfactant is sorbitan monooleate in an amount ranging from at least 0.1 g/l to at most 0.3 g/l, and a second nonionic surfactant is ethoxylated sorbitan monooleate in an amount ranging from at least 4.0 g/l to at most 7.0 g/l.

It has also been unexpectedly observed that the above concentrations, in particular for the preferred embodiments, allow a most efficient composition for sucker growth inhibition to be used. Moreover, said composition in the above concentrations (g/l) is particularly safe and user friendly, thus further improving the reliability of the composition; for instance during application on plants.

In some embodiments pelargonic acid or a composition comprising pelargonic acid is used for inhibiting the growth of suckers on plants of the following list: tobacco, *chrysanthemum*, carnation and/or azalea.

In some preferred embodiments pelargonic acid or a composition comprising pelargonic acid is used for inhibiting the growth of suckers on a tobacco plant variety selected from the following list: Aromatic Fire-cured, Latakia, Brightleaf or Virginia, Burley, Cavendish, Corojo, Criollo, Dokha, Ecuadorian Sumatra, Habano, Maduro, Oriental, Perique, Shade, Thuoc lao, Type 22, White Burley, and/or Wild Tobacco.

It has been found that pelargonic acid or a composition comprising pelargonic acid is particularly effective for inhibiting the growth of suckers on the listed plants. Moreover, the sucker growth inhibition is even more efficient on tobacco plants; as confirmed experimentally in Example 3.

In a third aspect the present invention relates to a composition comprising pelargonic acid in an amount between 50 and 90 w/w % and one or more sorbitan- or polysorbate-type nonionic surfactants in an amount between 10 and 50 w/w %, in which 100 w/w % is the total amount of pelargonic acid and one or more sorbitan- or polysorbate-type nonionic surfactants.

In some embodiments the composition comprises pelargonic acid in an amount between 55 and 90 w/w % and one or more sorbitan- or polysorbate-type nonionic surfactants in an amount between 10 and 45 w/w %, in which 100 w/w % is the total amount of pelargonic acid and one or more sorbitan- or polysorbate-type nonionic surfactants.

In some embodiments the composition comprises pelargonic acid in an amount between 60 and 90 w/w % and one or more sorbitan- or polysorbate-type nonionic surfactants in an amount between 10 and 40 w/w %, in which 100 w/w % is the total amount of pelargonic acid and one or more sorbitan- or polysorbate-type nonionic surfactants.

In some preferred embodiments the composition comprises pelargonic acid in an amount between 65 and 85 w/w % and one or more sorbitan- or polysorbate-type nonionic surfactants in an amount between 15 and 35 w/w %, in which 100 w/w % is the total amount of pelargonic acid and one or more sorbitan- or polysorbate-type nonionic surfactants.

In some preferred embodiments the composition comprises pelargonic acid in an amount between 70 and 85 w/w % and one or more sorbitan- or polysorbate-type nonionic surfactants in an amount between 15 and 30 w/w %, in which 100 w/w % is the total amount of pelargonic acid and one or more sorbitan- or polysorbate-type nonionic surfactants.

In some preferred embodiments the composition comprises pelargonic acid in an amount between 70 and 80 w/w % and one or more sorbitan- or polysorbate-type nonionic surfactants in an amount between 20 and 30 w/w %, in which 100 w/w % is the total amount of pelargonic acid and one or more sorbitan- or polysorbate-type nonionic surfactants.

In a further aspect, the present invention relates to a composition comprising pelargonic acid in an amount between 50 and 90 w/w %, one or more sorbitan- or polysorbate-type nonionic surfactants in an amount between 10 and 45 w/w %, and in in which 100 w/w % is the total amount of pelargonic acid and the one or more sorbitan- or polysorbate-type nonionic surfactants in the composition, and further comprising one or more auxiliaries or inerts. Preferably the amount of auxiliaries or inerts is between 0 and 95% of the total w/w % of all constituents of the composition.

A list of examples of auxiliaries or inerts includes, but is not limited to, organic solvents, antifreeze agents, thickeners, buffering agents, antifoaming agents, antioxidants, preservatives and colorants. Such auxiliaries and inerts are known in the art and are commercially available.

It has also been unexpectedly found that the disclosed weight ratio (w/w %) of pelargonic acid with regards to that of the one or more listed nonionic surfactants is particularly effective in achieving optimal dissolution rates, safety, without reducing the efficiency or efficacy of the active ingredient to inhibit sucker growth in said plants. In particular the preferred embodiments can further improve the efficiency of the composition. Moreover, the optimal concentrations can serve to further improve the cost and/or time efficiency of the sucker growth inhibition treatment by making a particular efficient use of the available product and equipment.

This composition is particularly efficient when produced as concentrated version suitable for dilution as a dilution on plants, for the nonionic surfactants improve the dissolution with an aqueous solvent, such as water, without reducing the efficiency of the active ingredient for inhibiting the growth of suckers on plants. For instance, a composition with a higher concentration or pelargonic acid (e.g. >50 g/l, comprising between 50 and 90 w/w %) and an adjusted concentration of a listed nonionic surfactant (e.g. comprising between 10 and 50 w/w %) can be manufactured, and then afterwards diluted with an aqueous solvent to the concentration efficient for inhibiting the growth of suckers on plants (e.g. ranging from at least 0.5 g/l to at most 50.0 g/l pelargonic acid). In an exemplary embodiment a composition is produced comprising 680 g/l pelargonic acid (i.e. ~75 w/w %) and 265 g/l of one or more nonionic surfactants (i.e. ~25 w/w %); said composition can then be diluted 50 times with water (i.e. a 2% concentration) to obtain a composition suitable for inhibiting the growth of suckers on plants comprising 13.6 g/l pelargonic acid (i.e. ~75 w/w %), 4.4 g/l of one or more nonionic surfactants (i.e. ~25 w/w %).

In some embodiments the composition comprises pelargonic acid and at least two nonionic surfactants, wherein a first nonionic surfactant is a polysorbate-type nonionic surfactant, preferably a polyoxyethylene glycol sorbitan alkyl ester chosen from polyoxyethylene sorbitan monooleate, polyoxyethylene sorbitan monolaurate, polyoxyethylene sorbitan monopalmitate and/or polyoxyethylene sorbitan monostearate; and wherein a second nonionic surfactant is a sorbitan-type nonionic surfactant, preferably a sorbitan alkyl ester chosen from, sorbitan monolaurate, sorbitan monopalmitate, sorbitan monostearate, sorbitan monooleate, sorbitan sesquioleate, sorbitan trioleate and/or sorbitan isostearate.

In some embodiments the composition comprises one or more nonionic surfactants selected from the following list: ethoxylated alcohols (e.g. Empilan KI 6) and polyethylene glycol alkyl ethers such as octaethylene glycol monododecyl ether (e.g. Slovasol 248) or pentaethylene glycol monododecyl ether (e.g. Marlipal 24/50); polypropylene glycol alkyl ethers (e.g. Witconol APM); glucoside alkyl ethers such as decyl glucoside, lauryl glucoside, octyl glucoside, C8-C16 fatty alcoholglucoside (e.g. EcoSense™300 surfactant) or C8-C14 fatty alcohol glucoside (cocoglucoside) (e.g. EcoSense™ 919 surfactant); polyethylene glycol octylphenyl ethers or octylphenol ethoxylates (9-10 EO) (e.g. Triton X-100); polyethylene glycol alkylphenyl ethers such as nonoxynol-9 or Nonylphenol ethoxylates (10 EO) (e.g. Makon 10); glycerol alkyl esters such as glyceryl laurate (e.g. Monomuls 90-L-12); polyoxyethylene glycol sorbitan alkyl esters or polysorbates (e.g. Tween 85); sorbitan alkyl esters (e.g. Span 60); cocamide monoethanolamide (MEA) (e.g.Ninol CMP); cocamide diethonalamide (DEA) (e.g. Ninol 11-CM); dodecyldimethylamine oxide such as Lauramine oxide (e.g. Ammonyx); block copolymers of polyethylene glycol and polypropylene glycol (e.g. Pluronic PE 10500); polyethoxylated tallow amine (POEA) (e.g. Ethomeen C12); ethopropoxylated alcohols (e.g. Agnique® KE 3551); ethoxylated tristyrylphenols (e.g. Soprophor® BSU); ethopropoxylated tristyrylphenols (e.g. Soprophor® 796/P); ethoxylated tributyl phenols (e.g. Sapogenat® T 080) and/or ethoxylated vegetable oils (e.g. ethoxylated castor oils such as Lucramul® CO 40). In other embodiments the one or more nonionic surfactants are selected from the following list: polyethylene glycol alkyl ethers such as octaethylene glycol monododecyl ether or pentaethylene glycol monododecyl ether; polypropylene glycol alkyl ethers; glucoside alkyl ethers such as decyl glucoside, lauryl glucoside or octyl glucoside; polyethylene glycol octylphenyl ethers such as Triton X-100; polyethylene glycol alkylphenyl ethers such as nonoxynol-9; glycerol alkyl esters such as glyceryl laurate; polyoxyethylene glycol sorbitan alkyl esters; sorbitan alkyl esters; cocamide MEA; cocamide DEA; dodecyldimethylamine oxide; block copolymers of polyethylene glycol and polypropylene glycol; and/or polyethoxylated tallow amine (POEA).

In some preferred embodiments the composition comprises pelargonic acid and one or more sorbitan- or polysorbate-type nonionic surfactants. In some other preferred embodiments the composition comprises pelargonic acid and one or more polyoxyethylene glycol sorbitan alkyl esters or sorbitan alkyl esters. In some other preferred embodiments the composition comprises pelargonic acid and at least two nonionic surfactants, wherein a first nonionic surfactant is polyoxyethylene sorbitan monooleate and wherein a second nonionic surfactant is sorbitan monooleate.

In some preferred embodiments the composition consists of pelargonic acid and one or more sorbitan- or polysorbate-type nonionic surfactants. In some other preferred embodiments the composition consists of pelargonic acid and one or more polyoxyethylene glycol sorbitan alkyl esters or sorbitan alkyl esters. In some other preferred embodiments the composition consists of pelargonic acid and two sorbitan- or polysorbate-type nonionic surfactants. In some other preferred embodiments the composition comprises pelargonic acid and two or more polyoxyethylene glycol sorbitan alkyl esters or sorbitan alkyl esters. In some preferred embodiments the composition consists of pelargonic acid and two nonionic surfactants, wherein a first nonionic surfactant is polyoxyethylene sorbitan monooleate and wherein a second nonionic surfactant is sorbitan monooleate.

The inventors have unexpectedly observed that a composition comprising pelargonic acid and one or more listed nonionic surfactants is particularly effective and suitable for use as sucker growth inhibitor for plants. The listed nonionic surfactants can further improve the safety, efficacy and efficiency of the composition. This composition is particularly useful when produced in a concentrated form, to be applied as a dilution on plants, for it improves the dissolution with an aqueous solvent, such as water, without reducing the efficiency of the active ingredient to inhibit sucker growth in said plants. In particular the listed preferred embodiments may further improve the efficiency of the composition.

To achieve inhibition of suckers, the composition may be applied to suckers on the mature plant in the form of solutions, emulsions, dust formulations, pastes or the like. If the form is water soluble, it may simply be dissolved therein in an amount sufficient to give the desired concentration. In the case of water solutions of active ingredients, an amount of a wetting agent may be added merely to increase the coverage and flow characteristics of the liquid. If the form is water-insoluble, a liquid emulsion may be prepared by dispersing the composition in water containing a small amount of a non-phytotoxic solvent, such as acetone and adding thereto an emulsifier.

In particular the pelargonic acid and the one or more nonionic surfactants can be formulated in Emulsifiable Concentrate (EC) form. The combination can also be prepared in other forms such as in Concentrated Oil-in-Water Emulsion (EW) and in Oil-in-Water Microemulsion (ME) forms and may further comprise one or more auxiliaries or inerts as listed above.

In some embodiments the composition comprises an agriculturally acceptable dosage form; comprising pelargonic acid in an amount ranging from at least 0.5 g/l to at most 50.0 g/l.

In some embodiments the composition comprises a concentrated dosage form; preferably configured for application by dilution. An exemplary embodiment may be a highly concentrated composition comprising 500.0 g/l pelargonic acid, which can be diluted in an aqueous medium to obtain a solution suitable for inhibiting the growth of suckers on plants to comprise anywhere from 0.5 (i.e. a 0.1% concentration) to 50.0 g/l (i.e. a 10% concentration) of pelargonic acid.

In some embodiments the composition comprises an agriculturally acceptable solid dosage form; preferably configured for application of granules or dispersion in water (e.g. wettable powder or water dispersible granules). These solid dosage forms can subsequently be dissolved, pulverized, etc., to obtain an agriculturally acceptable dosage form suitable for inhibiting the growth of suckers on plants.

There exist many forms of agricultural equipment and methods. The skilled person will understand that the composition according to any embodiments of the present invention can be further adapted or adjusted to better suit particular agricultural equipment and/or methods without affecting the efficiency or safety of the composition. In certain cases a synergistic effect may even be obtained, further increasing the efficiency of the composition.

In a fourth aspect the present invention relates to a method for inhibiting the growth of suckers on plants, which comprises treating a plant with pelargonic acid or a composition comprising pelargonic acid with an amount effective to inhibit the growth of one or more suckers on said plant.

In some embodiments the method comprises applying pelargonic acid or a composition comprising pelargonic acid for inhibiting the growth of suckers on plants of the following list: tobacco, *chrysanthemum*, carnation and/or azalea.

In some preferred embodiments the method comprises applying pelargonic acid or a composition comprising pelargonic acid for inhibiting the growth of suckers on a tobacco plant variety selected from the following list: Aromatic Fire-cured, Latakia, Brightleaf or Virginia, Burley, Cavendish, Corojo, Criollo, Dokha, Ecuadorian Sumatra, Habano, Maduro, Oriental, Perique, Shade, Thuoc lao, Type 22, White Burley, and/or Wild Tobacco.

The inventors have found that the method of applying pelargonic acid or a composition comprising pelargonic acid is particularly effective for inhibiting the growth of suckers on the listed plants. Moreover, the method is even more efficient on tobacco plants; as confirmed experimentally in Example 3.

In some embodiments the method comprises applying pelargonic acid or the composition comprising pelargonic acid in an amount ranging from at least 0.5 g/l to at most 50.0 g/l, preferably from 1.5 to 35.0 g/l; more preferably from 2.5 to 25.0 g/l, from 3.0 to 20 g/l; from 13.6 to 20.4 g/l or from 17 to 27 g/l; most preferably or from 3.5 to 15.0 g/l. In preferred embodiments said plant is selected from tobacco, *chrysanthemum*, carnation and/or azalea.

In some embodiments the method comprises applying the composition comprising pelargonic acid and one or more nonionic surfactants for inhibiting the growth of suckers on plants, wherein said composition comprises one or more nonionic, preferably two or more, surfactants in an amount ranging from at least 0.01 g/l to at most 50.0 g/l; preferably from 0.1 to 35.0 g/l or from 0.16 to 16 g/l; more preferably from 0.5 to 25.0 g/l, from 0.8 to 8 g/l or from 1 to 6.5 g/l; most preferably from 4.4 to 6.6 g/l, from 3.2 to 6.5 g/l or from 1.0 to 15.0 g/l. In preferred embodiments said plant is selected from tobacco, *chrysanthemum*, carnation and/or azalea.

In some embodiments the method comprises applying the composition comprising pelargonic acid and one or more, preferably two or more nonionic surfactants for inhibiting the growth of suckers on plants, wherein said composition comprises (a) pelargonic acid in an amount ranging from at least 0.5 g/l to at most 50.0 g/l; preferably from 1.5 to 35.0 g/l; more preferably from 2.5 to 25.0 g/l; most preferably from 3.5 to 15.0 g/l; and (b) one or more nonionic surfactants in an amount ranging from at least 0.01 g/l to at most 50.0 g/l; preferably from 0.1 to 35.0 g/l; more preferably from 0.5 to 25.0 g/l; most preferably from 1.0 to 15.0 g/l.

In some other embodiments the method comprises applying the composition comprising pelargonic acid and one or more, preferably two or more nonionic surfactants for inhibiting the growth of suckers on plants, wherein said composition comprises (a) pelargonic acid in an amount ranging from at least 0.5 g/l to at most 50.0 g/l; preferably from 1.5 to 35.0 g/l; more preferably from 2.5 to 25.0 g/l, from 3.0 to 20 g/l or from 13.6 to 20.4 g/l or from 17 g/l to 27 g/l; most preferably from 10 g/l to 20 g/l or from 3.5 to 15.0 g/l; and (b) one or more nonionic surfactants in an amount ranging from at least 0.16 to at most 16 g/l; preferably from 0.5 to 11.3 g/l; more preferably from 0.8 to 8.0 g/l, from 1 to 6.5 g/l or from 4.4 to 6.6 g/l; more preferably from 0.8 to 8.0 g/l, from 1 to 6.5 g/l, from 4.4 to 6.6 g/l or from 5.5 to 8.7 g/l; most preferably from 3.2 to 6.5 g/l or from 1.1 to 4.8 g/l.

The method is not known to cause adverse ecological or phytotoxic effects when applied in the above concentrations, more specific if it is used with a composition comprising the nonionic surfactants between 4.4 and 6.6 g/l and pelargonic acid in a concentration of between 13.6 and 20.4 g/l; such as introducing foreign residues or inducing metabolic changes into the central plant. Therefore it may be used safely without significantly compromising the quality and yield of the plant, its leaves, or of the resultant products. Additionally, the method appears to be nontoxic and nonhazardous; for instance when sprayed of the central plant or its leaves.

The inventors have also unexpectedly observed that the he above embodiments, further improve the efficiency of the use of the composition. In particular, the method of applying pelargonic acid or the composition in the above concentrations (g/l) has shown to achieve optimal results in terms of safety and efficacy. More in particular said composition in the above concentrations (g/l) can serve to further improve the cost and/or time efficiency of the sucker growth inhibition method by making a particular efficient use of the available product and equipment.

In some embodiments the method comprises applying pelargonic acid or the composition according an embodiment of the present invention during the initial development stage of an undesired sucker.

In some embodiments the method comprises the initial application of pelargonic acid or the composition according an embodiment of the present invention during the initial development stage of an undesired sucker, and wherein the pelargonic acid or the composition comprising pelargonic acid is reapplied at a specified time interval of 3 days to 10 days, preferably 4 to 8 days, most preferably 5 to 7 days, as from the initial development stage of an undesired sucker and this until the full floral development stage of the plant.

Although pelargonic acid may already inhibit the sucker growth during the initial development stage of the plant, some plant varieties grow additional suckers which require a reapplication of pelargonic acid at a later stage. To achieve a high (i.e. >90%) sucker growth control of a field the reapplication may need be repeated on a frequent basis; the exact frequency and interval of course depending on the plant variety and the concentration of pelargonic acid. In an exemplary embodiment a plant field may be treated with 450 l/ha comprising 7.0 g/l pelargonic acid up to four times with an interval of 7 days between treatments to yield a high sucker growth inhibition across. In another exemplary embodiment, a plant field, such as a tobacco plant field, may be treated with 500 l/ha comprising between 13.6 and 20.4 g/l pelargonic acid up to four times with an interval of 7 days between treatments to obtain a high sucker growth inhibition.

In some embodiments the method comprises applying the composition comprising pelargonic acid and one or more nonionic surfactants preferably chosen from sorbitan- or polysorbate-type nonionic surfactants.

In some embodiments the method comprises spraying, sprinkling, showering, spritzing, spreading in droplets, spattering; dispersing, diffusing; and/or douching one or more plants with pelargonic acid or a composition comprising pelargonic acid.

When sprayed in a solution or in droplets on a plant or plant leaves, the pelargonic acid will flow along the plant's stem or shaft to reach the sucker, where it can effectively start inhibiting the sucker growth. This improves the user friendliness allowing a more efficient use of available product and equipment, which results in a more efficient management of time and costs. The method may be found discussed in further detail in Example 2.

In some embodiments the method comprises applying pelargonic acid or the composition comprising pelargonic acid in an amount ranging from at least 300 to at most 800 l/ha of land; preferably 400 to 700 l/ha of land; more preferably 450 to 600 l/ha of land; most preferably 500 to 550 l/ha of land.

The inventors have also unexpectedly observed that the above embodiments achieve a particularly efficient use of pelargonic acid or the composition. In particular, the method of applying pelargonic acid or the composition in the above quantities (l/ha) has shown to achieve optimal results in terms of safety and efficacy. More in particular if the pelargonic acid can be easily applied in said quantities (l/ha) on plants in the form of droplets in a solution it may further improve the cost and/or time efficiency of the sucker growth inhibition treatment by making a particular efficient use of the available product and agricultural equipment.

In a fifth aspect the present invention relates to the use of a surfactant system comprising one or more nonionic surfactants chosen from polyoxyethylene glycol sorbitan alkyl esters or sorbitan alkyl esters for sucker control on plants. A list of such nonionic surfactants is provided earlier herein. Preferably, the surfactant system comprises at least one polyoxyethylene glycol sorbitan alkyl ester and at least one sorbitan alkyl ester.

EXAMPLES

Example 1: Use of Pelargonic Acid for Inhibiting the Growth of Suckers on Plants To better exemplify reference is made to FIGS. 1A and 1B, which show a tobacco plant (100) of the Burley variety.

Figure 1A:
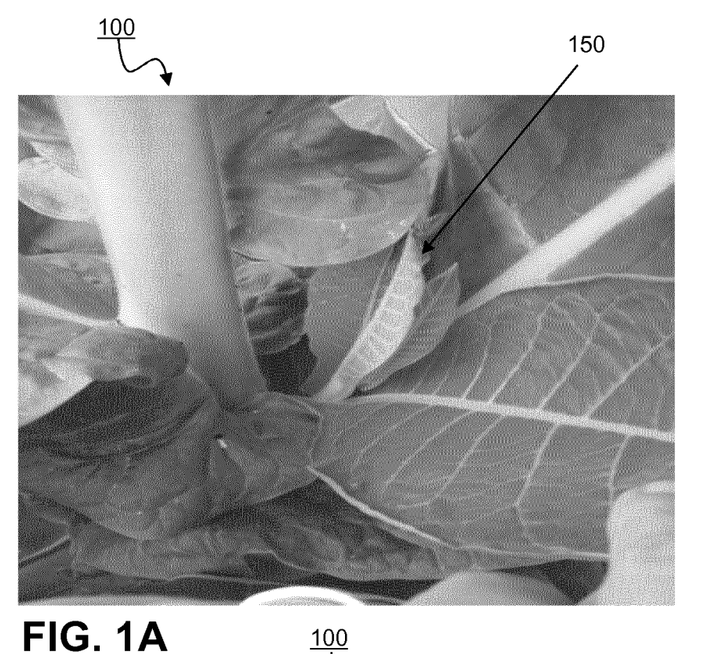
FIG. 1A shows a plant (100) without the use of a sucker growth inhibitor.

FIG. 1A in particular shows a plant (100) without the use of a sucker growth inhibitor, serving as reference value. It can be observed that at full floral development (i.e. ~3 to 4 months) suckers (150) started to proliferate and grew into auxiliary stems.

Figure 1B:
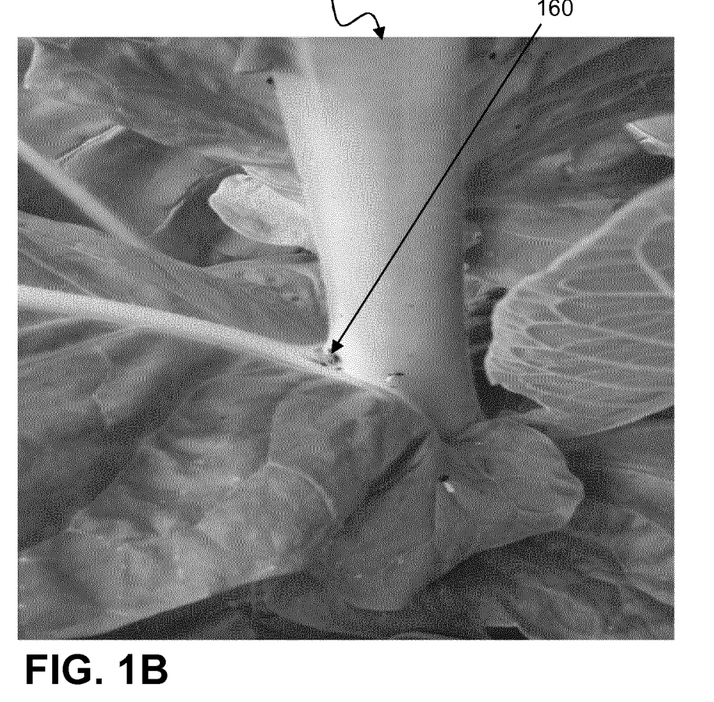
FIG. 1B shows a similar plant (100) plant after the use of pelargonic acid or a composition comprising pelargonic acid according to the invention for inhibiting the growth of suckers. These figures are discussed in further detail in Example 1.

FIG. 1B shows a similar plant (100) after the use of pelargonic acid or a composition comprising pelargonic acid for inhibiting the growth of suckers, wherein said pelargonic acid was applied on the plant in an amount ranging from at least 0.5 g/l to at most 50.0 g/l. It can be observed that the sucker (160) growth was fully inhibited, preventing any further proliferation or growth.

Example 2: Method of Applying Pelargonic Acid for Inhibiting the Growth of Suckers on Plants To better exemplify reference is made to FIGS. 2A and 2B, which show a field of tobacco plants (110) of the Burley variety being sprayed with pelargonic acid or a composition comprising pelargonic acid.

Figure 2A:
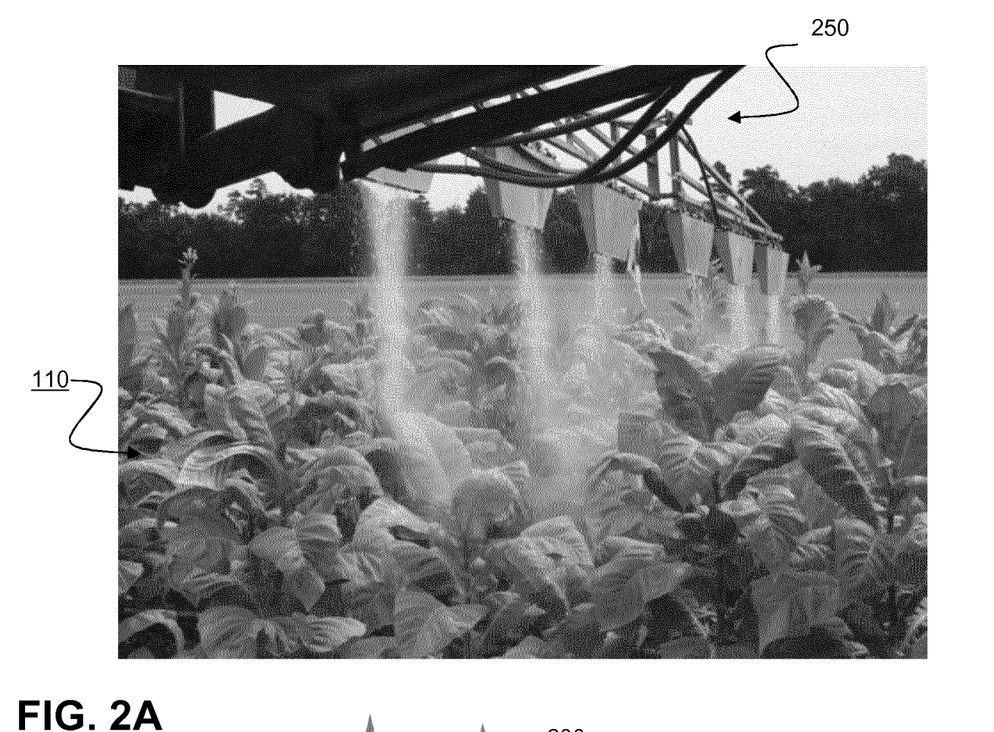
FIG. 2A: shows a field of tobacco plants (110) being sprayed.

FIG. 2A shows agricultural equipment (250) configured for spraying a field of tobacco plants (110) with with pelargonic acid or a composition comprising pelargonic acid.

Figure 2B:
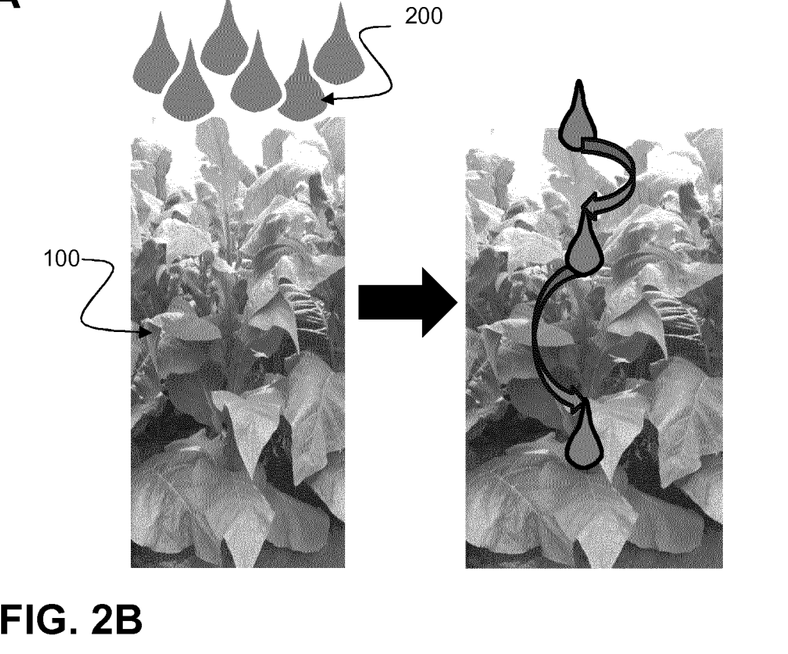
FIG. 2B shows the flow of a composition comprising pelargonic acid according to the invention (200) when sprayed on a plant (100). These figures are discussed in further detail in Example 2.

FIG. 2B shows how the pelargonic acid (200) when sprayed on a plant (100) or its leaves will flow along the plant's stem or shaft to reach a sucker, where it can effectively start inhibiting the sucker growth. Since pelargonic acid is not known to cause adverse ecological or phytotoxic effects when applied in the concentrations ranging from at least 0.5 g/l to at most 50.0 g/l, it can be safely sprayed on the plants without significantly compromising the quality and yield of the plant, its leaves, or of the resultant products.

Example 3: Experimental Data on Tobacco Plants

In an experimental embodiment tobacco plants of the Burley and Virginia were treated with a Volume (V) of 450-460l/ha with a composition comprising pelargonic acid (PA) at different concentrations (e.g., 3.4 g/l, 5.1 g/l and 6.8 g/l) with an interval of 7 days between treatments; the exact experimental details can be found in Table 1. The treatment yielded a high sucker growth inhibition (i.e. >90% sucker inhibition) across all the plants; no phytotoxicity or adverse ecological effects were observed.

TABLE 1 treatment of tobacco plants with pelargonic acid (PA)

| | Modality | | | | |
|---|---|---|---|---|---|
| | T1 | T2 | T3 | T4 | T5 |
| | | | Treatment date | | |
| | Before pollarding/ topping | T1 + 7 days | T2 + 7 days After pollarding/topping (2 days after topping) | T3 + 7 days | T4 + 7 days |
| 1 | 3.4 g/l PA (V = 450 to 460 L/ha) | 6.8 g/l PA (V = 450-460 L/ha) | 6.8 g/l PA (V = 450-460 L/ha) | 6.8 g/l PA (V = 450-460 L/ha) | 6.8 g/l PA (V = 450-460 L/ha) |
| 3 | 5.1 g/l PA (V = 450-460 L/ha) | 5.1 g/l PA (V = 450-460 L/ha) | 5.1 g/l PA (V = 450-460 L/ha) | 5.1 g/l PA (V = 450-460 L/ha) | 5.1 g/l PA (V = 450-460 L/ha) |
| 4 | 15 L/ha Antak (V = 400 L/ha) | 15 L/ha Antak (V = 700 L/ha) | | | |

Antak ® is a tobacco sucker control agent used to obtain comparative results.

Example 4: Comparative Trial on Tobacco Plants

In a field test in the South of France, tobacco plants of the Burley variety were planted in an experimental plot and treated with the composition of the invention (BCP1004D) at different dilutions (and thus concentration). In addition, two other commercial available products containing pelargonic acid were tested. For each treatment, the volume sprayed was 500l/ha. The composition of undiluted BCP1004 contained about 75.7% w/w pelargonic acid (minimal purity 95%), about 23.5% w/w polyoxyethylene sorbitan ester and about 0.85% sorbitan ester.

Different dilutions of BCP1004D corresponding with different concentrations of PA (g/l) were tested for sucker control and for their phytotoxic effect on the rest of the plant.

The two commercial products were used at a dilution corresponding with 13.6 g/l PA, ie Scythe at 2.39% and Finalsan Total Vegetation Killer at 6.8%.

The plants were treated and thereafter visually inspected for sucker control 6 and 13 days after spraying.

Table 2 shows the burning of suckers at different concentrations of BCP1004D, 6 days after treatment.

TABLE 2

| TREATMENT (pelargonic acid g/l) | Scoring of sucker control (scale from 1 to 5) |
| --- | --- |
| BCP1004D at 4% (27.2 g/l) | 4.6 |
| BCP1004D at 3.75% (25.5 g/l) | 4.6 |
| BCP1004D at 3.5% (23.8 g/l) | 4.3 |
| BCP1004D at 3.25% (22.1 g/l) | 4.4 |
| BCP1004D at 3% (20.4 g/l) | 3.8 |
| BCP1004D at 2.75% (18.7 g/l) | 4.1 |
| BCP1004D at 2.5% (17 g/l) | 4.1 |
| Scythe at 2.39% (13.6 g/l) | 3.9 |
| Finalsan TVK at 6.18% (13.6 g/l) | 3.8 |
| BCP1004D at 2.25% (15.3 g/l) | 3.2 |
| BCP1004D at 2% (13.6 g/l) | 3.0 |
| BCP1004D at 1.5% (10.2 g/l) | 1.5 |
| BCP1004D at 1% (6.8 g/l) | 1.3 |
| Untreated | 1.0 |

Besides the efficacy; the selective burning of suckers while leaving other plant leaves unaffected is of commercial importance.

Figure 3:
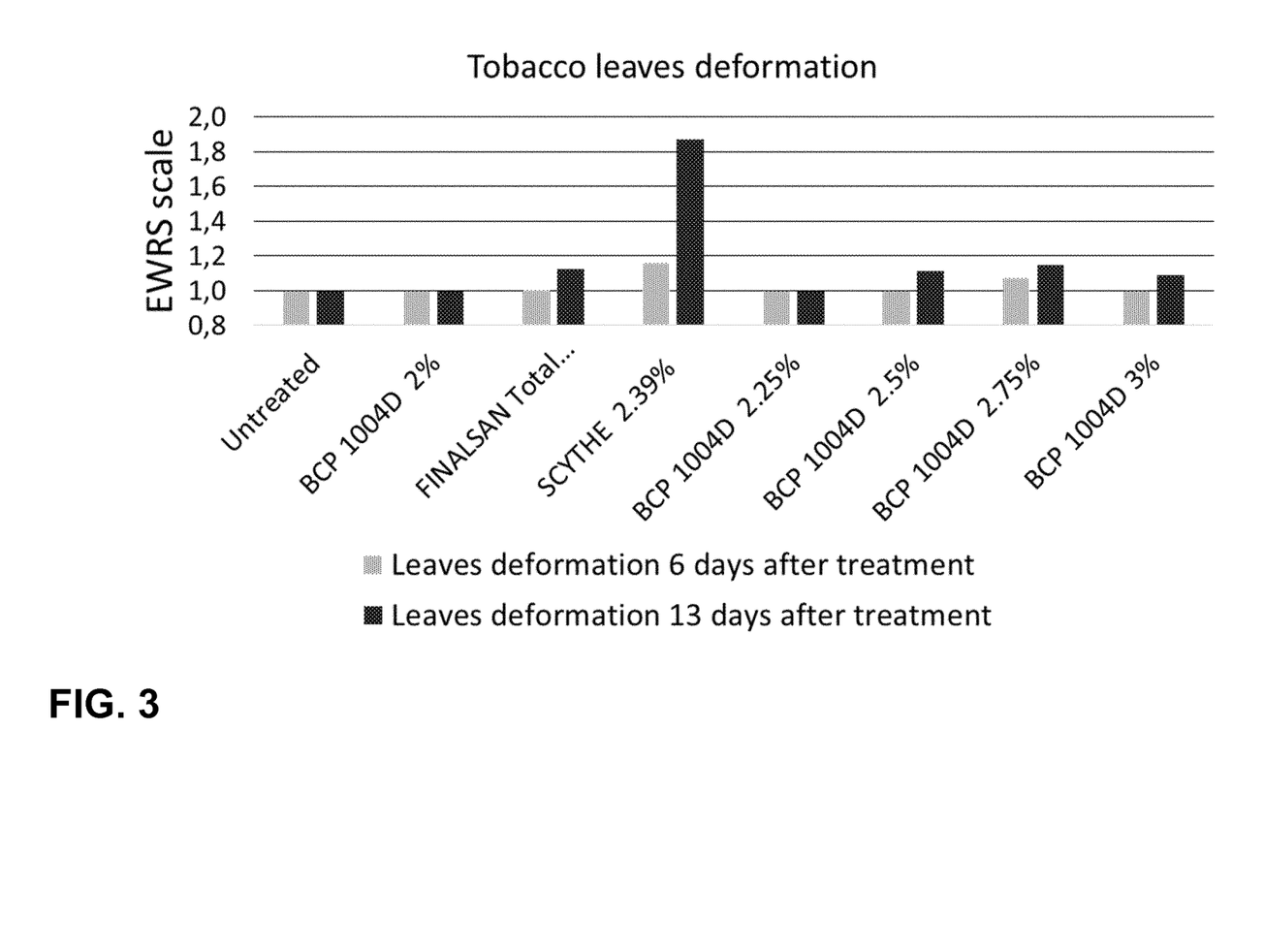
FIG. 3: shows a graph of the progression of phytotoxity at different timepoints after treatment of the tobacco plant with different dilutions of pelargonic acid in BCP1004D and two commercial products. The concentration of pelargonic acid in the dilutions can be found in Table 2.

FIG. 3 shows the phytotoxicity on plant leaves treated either with BCP1004D or with the commercial products. Phytotoxicity was scored at two time points, ie on day 6 and day 13 after treatment. The scale of the EWRS score is between 1 and 5 as follows:

1: no decolouring or deformation of leaves;
between 1 and 1.9: slight decolouration and deformation of leaves;
as of 1.9: at least 30% of the leaves show decolouration and deformation, and has a commercial impact on the production of goods.

Figure 4:
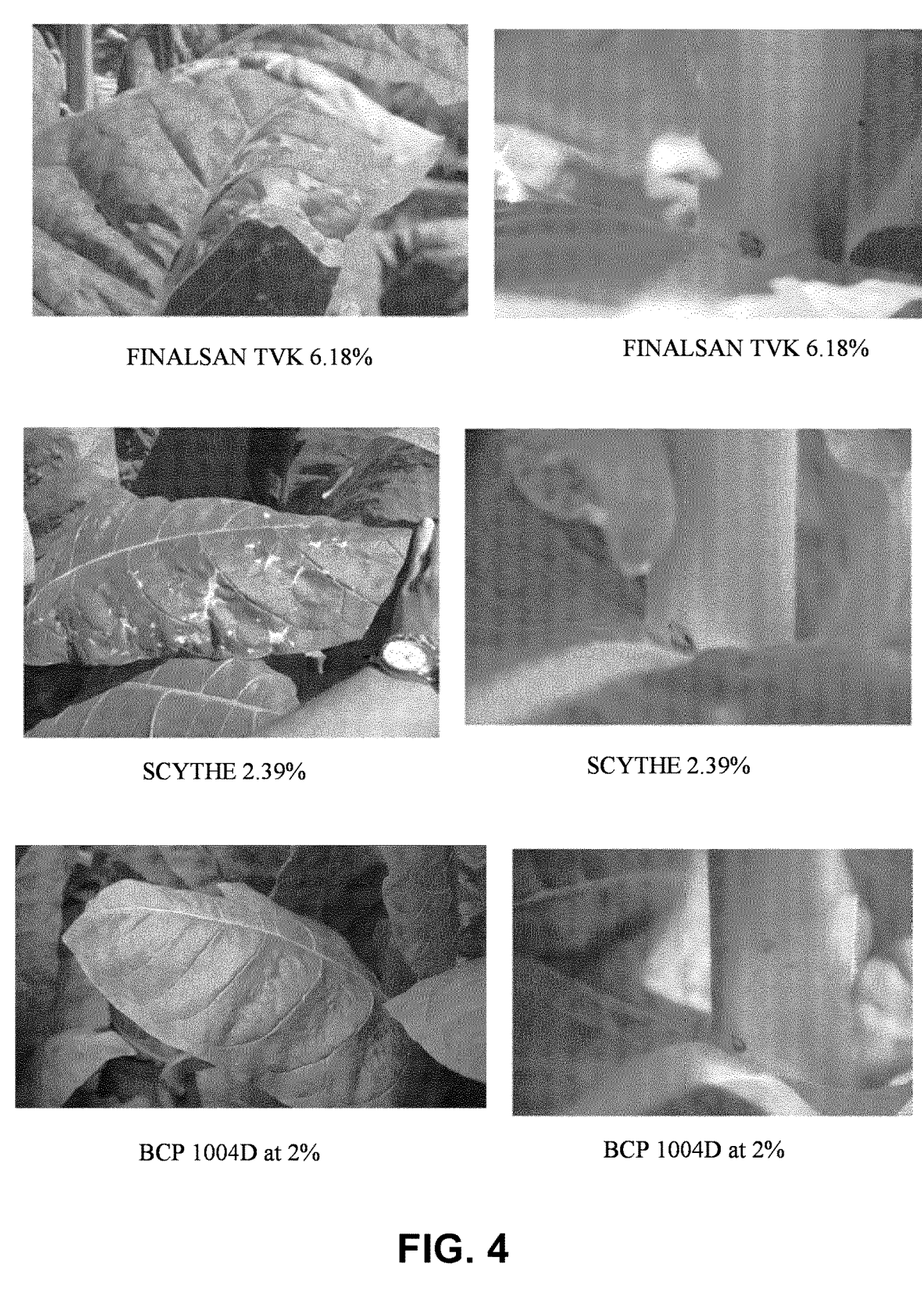
FIG. 4: shows pictures of leaves 3 days after treatment with three products wherein the concentration of pelargonic is the same, namely 13.6 g/l. One of the products is BCP1004D, the others are commercial products.

FIG. 4 shows pictures of the leaves of tobacco plants treated with the commercial products and BCP1004D at a dilution containing the same concentration of pelargonic acid (ie 13.6 g/l). The pictures are taken 3 days after treatment. FIG. 4 in the right side pictures shows the sucker control. FIG. 4 in the left side pictures shows the burning effect on the leaves. Such damaged leave as obtained with Scythe and Finalsan Total Vegetation Killer cannot be used in the production of goods.

These results demonstrate that at the same concentration, BCP1004D selectively kills the suckers with no effect on the leaves while the two other tested commercial products have important effect on the yield and the quality of the leaves.

The invention claimed is:

1. A composition effective in inhibiting the growth of suckers on plants comprising pelargonic acid in an amount between 50 and 90 w/w % and two or more nonionic surfactants in an amount between 10 and 50 w/w %, in which 100 w/w % is the total amount of pelargonic acid and two or more nonionic surfactants, wherein said two or more nonionic surfactants are selected from polyoxyethylene sorbitan alkyl esters and sorbitan alkyl esters, wherein the first nonionic surfactant is a polyoxyethylene sorbitan alkyl ester, wherein the second nonionic surfactant is a sorbitan alkyl ester selected from the group consisting of sorbitan monolaurate, sorbitan monopalmitate, sorbitan sesquioleate, sorbitan trioleate, and sorbitan isostearate, and wherein the pelargonic acid is the sole active ingredient in the composition for inhibiting the growth of the suckers on the plants.

2. The composition according to claim 1, wherein the polyoxyethylene sorbitan alkyl ester is selected from the group consisting of one or more of polyoxyethylene sorbitan monolaurate, polyoxyethylene sorbitan monopalmitate, polyoxyethylene sorbitan monooleate and polyoxyethylene sorbitan monostearate.

3. A method for inhibiting the growth of suckers on plants, which comprises treating a plant with a composition comprising pelargonic acid and two or more nonionic surfactants, wherein said pelargonic acid is in an amount effective to inhibit the growth of one or more suckers on said plant, wherein said two or more nonionic surfactants are selected from polyoxyethylene sorbitan alkyl esters and sorbitan alkyl esters, wherein the first nonionic surfactant is a polyoxyethylene sorbitan alkyl ester, wherein the second nonionic surfactant is a sorbitan alkyl ester selected from the group consisting of sorbitan monolaurate, sorbitan monopalmitate, sorbitan sesquioleate, sorbitan trioleate, and sorbitan isostearate, and wherein the pelargonic acid is the sole active ingredient in the method for inhibiting the growth of the one or more suckers on the plant.

4. The method according to claim 3, wherein said plant is selected from tobacco, chrysanthemum, carnation and/or azalea.

5. The method according to claim 3, wherein the composition is applied during the initial development stage of an undesired sucker and wherein the composition is reapplied at a specified time interval of 3 days to 10 days, 4 to 8 days, or 5 to 7 days, as from the initial development stage of the undesired sucker and this until the full development stage of the plant.

6. The method according to claim 3, wherein the treating comprises spraying, sprinkling, showering, spritzing, spattering, or douching the plant with the composition, or spreading in droplets, dispersing, or diffusing the composition on the plant.

7. The method according to claim 3, wherein said composition comprises pelargonic acid in an amount ranging from at least 0.5 g/l to at most 50.0 g/l of the composition.

8. The method according to claim 3, wherein the polyoxyethylene sorbitan alkyl ester is selected from the group consisting of one or more of polyoxyethylene sorbitan monooleate, polyoxyethylene sorbitan monolaurate, polyoxyethylene sorbitan monopalmitate and polyoxyethylene sorbitan monostearate.

* * * * *